United States Patent
Hamamura et al.

[11] Patent Number: 6,034,498
[45] Date of Patent: Mar. 7, 2000

[54] SERVO ADJUSTMENT METHOD AND APPARATUS THEREFOR

[75] Inventors: Minoru Hamamura, Numazu; Sadaji Hayama; Jun Fujita, both of Mishima, all of Japan

[73] Assignee: Toshiba Kikai Kabushiki Kaisha, Tokyo-To, Japan

[21] Appl. No.: 09/108,305

[22] Filed: Jul. 1, 1998

[30] Foreign Application Priority Data

Jul. 2, 1997 [JP] Japan .................................. 9-177264

[51] Int. Cl.[7] .................................................. G05D 23/275
[52] U.S. Cl. ................... 318/632; 318/625; 318/568.22; 318/432; 318/434; 318/280
[58] Field of Search .................... 318/632, 625, 318/568.22, 432, 434, 280

[56] References Cited

U.S. PATENT DOCUMENTS 3,566,231  2/1971  Pfeiffer ...................................... 318/632
5,915,612  7/1998  Hinton ....................................... 318/632

*Primary Examiner*—Karen Masih
*Attorney, Agent, or Firm*—Fish & Richardson P.C.

[57] ABSTRACT

Response delay error is calculated from an instructed position based on a position of a moving body and a position instruction to detect reversal of a servo motor and to compare response delay error produced in reversal of the servo motor and threshold value. In the case where response delay error is a threshold value or greater, the value of the already determined compensation torque is updated into a value that enables the response delay error to be decreased, and allows the moving body to carry out circular arc complementary feed motion under the same condition to compensate, based on the updated compensation torque, instructed torque for instructing the servo motor when reversal of the servo motor is detected. Compensating the instructed torque and updating the compensation torque is repeated until the response delay error is at the threshold value or less. Thus, a reasonable compensation torque is determined such that response delay error at the time of reversal of the servo motor is minimized.

7 Claims, 5 Drawing Sheets

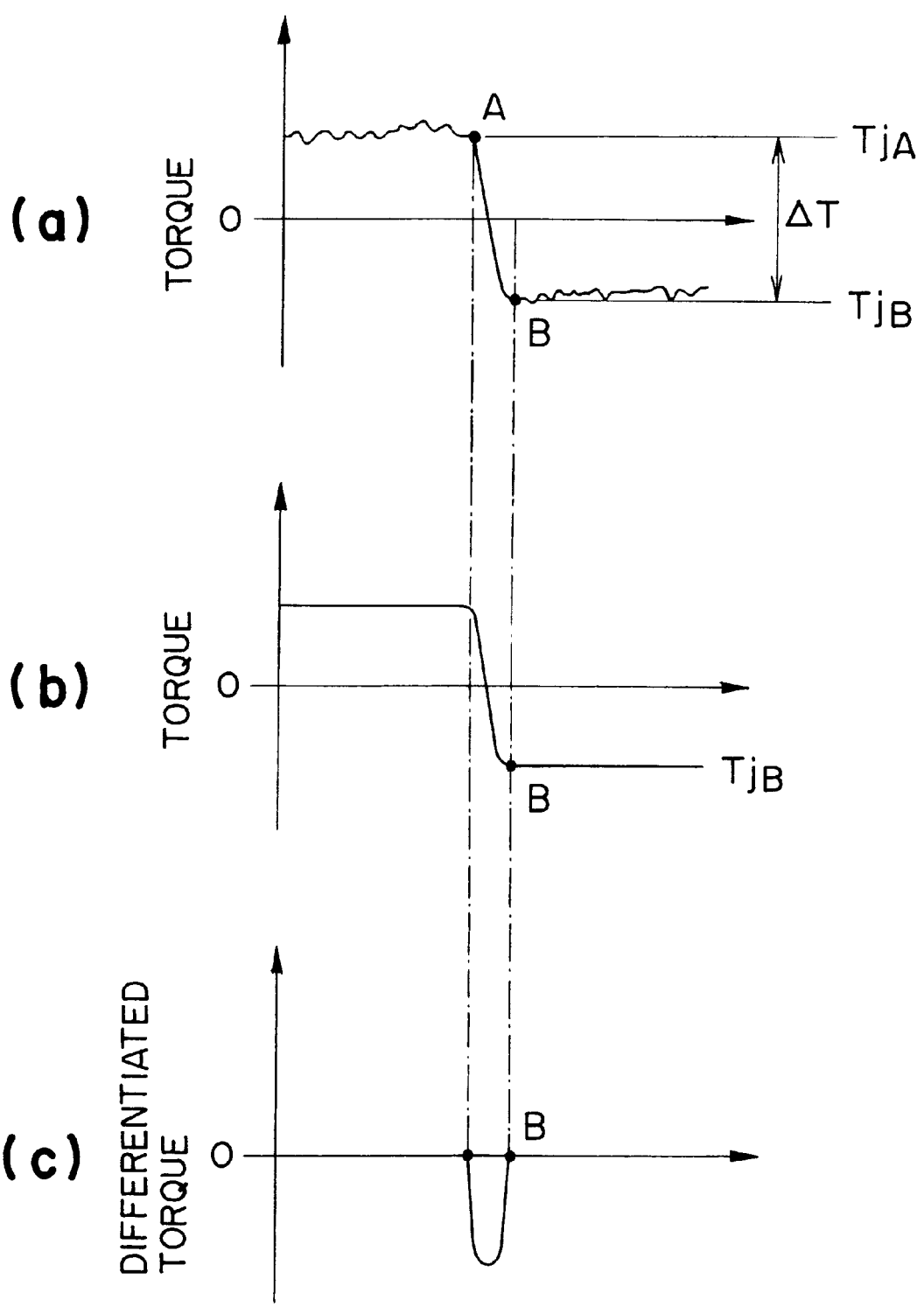
F I G. 5

SERVO ADJUSTMENT METHOD AND APPARATUS THEREFOR

BACKGROUND OF THE INVENTION

1. Field of the Invention

This invention relates to a servo adjustment method and an apparatus for servomotor which drives machine tools or industrial robots, and more particularly to a servo adjustment method and an apparatus which improve a delay in response to an instructed position for reversing of the servomotor to improve accuracy of position control.

2. Prior Art

In NC machine tools, a control system for a servomotor which drives moving body such as table, etc., is provided with a position control loop which makes the deviation between a NC position instruction signal and a feedback signal provided by a position transducer which detects the position of the moving body reduced to zero. In the servo control system, a velocity control loop obtains a velocity feedback signal by differentiating position feedback signal provided by the position control loop, and sends an output of speed loop gain as a torque signal to the servomotor.

For the purpose of carrying out circular arc cutting by the machine tool, two servomotors which drive a feed axis respectively are simultaneously controlled to allow the moving body for a circular interpolation feed motion. When rotating direction of the motor is reversed, moving direction of the moving body cannot be responsively reversed. For this reason, a delay in a response to the instructed position takes place. When the movable body moves along a circular path from one quadrant to an adjacent quadrant, there takes place a response error such that an actual path of the movable body deviates and bulges out from a desired path specified by a path command. Such phenomenon is called stick motion or quadrant protrusion and is one of the main cause of the deterioration of accuracy in machining.

The reason why such a phenomenon takes place is presumed as follows. It is necessary to invert torque signal to match with frictional torque when the motion direction is reversed. However, a feed shaft drive mechanism is temporarily stopped due to a delay caused by the response characteristic of the velocity loop.

A conventional compensation method which has been employed in reducing the response error produced at the moment of the reversal of the servomotor, includes steps as follows. An instructed torque value at the time of the reversal of the servomotor is detected, to determine a reference value of a compensation torque for compensation on the basis of the detected torque signal by trail and error. An operator carries out parameter-input procedures for inputting values of compensation torque into the NC unit.

However, according the above method, the operator determines the values of compensation torque in dependency upon his own skills and experiences. As a result, there were variations (unevenness) in result of the compensation in dependency upon the degree of skillfulness of the operator.

In addition, in determining compensation torque, value of suitable compensation torque was empirically determined while measuring error in response delay by using an instrument for measuring the accuracy of the circular interpolation feed motion. For this reason, high level skillfulness was required for that work.

In addition, since errors caused by response delay is varied according to the condition such as feed speed or circular arc radius, etc., even when the same machine is employed, parameter-inputting procedure for compensating torques had to be repeated for every condition. As a result, that work was troublesome.

SUMMARY OF THE INVENTION

In view of the above, an object of this invention is to provide a servo adjustment method and an apparatus therefor, which have solved problems that the prior art has to have ability of automatically determining suitable compensation torque such that response error at the moment of the reversal of servo motor is allowed to be as small as possible to securely decrease quadrant protrusion.

In order to attain the above-mentioned object, this invention is directed to an adjustment method for a servo mechanism of servomotors for driving first feed shaft and second feed shaft of a moving body, the method comprising steps of:

controlling the servomotor of the feed shaft while detecting position of the moving body so that the moving body follows an instructed position to allow the moving body to move a circular interpolation feed motion under a condition of a designated circular arc radius and a feed rate;

detecting a reversal of the servomotor in which the direction of motion of the moving body changes;

detecting a torque signal sent to the servomotor at the reversal;

calculating a response error deviated from an instructed position on the basis of position of the moving body and the instructed position;

determining a compensation torque to predetermined value for serving as reference for correcting the instructed torque;

setting a threshold value for serving as reference value of updating of the compensation torque;

comparing the response error produced in the reversal of the servomotor with the threshold value;

updating a value of the determined compensation torque into a value that enables the response error to be decreased in a case where the response error is more than the threshold value, and allows the moving body to carry out the circular interpolation feed motion under the same condition;

compensating, on the basis of the updated compensation torque, the instructed torque which is sent to the servomotor in detecting the reversal of the servomotor to update the reference torque when the response error is more than the threshold value; and repeatedly carrying out compensation of the torque and updating of the compensation torque until the response error is within the threshold value.

In addition, this invention is characterized in that, in the method, an approach is employed to allow the moving body to carry our circular interpolation feed motion under the condition of an arbitrary circular arc radius and feed rate to determine the compensation torque such that the response error is less than the threshold value and to prepare a compensation torque table for storing the compensation torque coresponding to an arbitrary circular arc radius and feed rate.

In accordance with the servo adjustment method of this invention, the compensation torque is automatically updated until response error falls within a certain threshold value. Thus, optimum compensation torque is determined.

In actual processing, torque compensating is executed at time of reversal of the servomotor on the basis of this optimum compensation torque. Thus, quadrant projection is precisely reduced.

In addition, an apparatus for carrying out the servo adjustment method comprises first position detecting means for detecting position of a moving body driven by a servomotor of the first feed shaft;

second position detecting means for detecting position of a moving body driven by a servomotor of the second feed shaft;

a servo mechanism for controlling the servomotors of the feed shafts while detecting position of the moving body so that the moving body follows an instructed position to allow the moving body to move circular interpolation feed motion under the condition of a designated circular arc radius and feed rate;

means for detecting a reversal of the respective servo motors;

means for calculating a response error deviated from an instructed position on the basis of detected position of moving body and the instructed position;

means for comparing the response error produced at the reversal of the servomotor with a predetermined threshold value;

means for compensating, on the basis of a predetermined compensation torque, the instructed torque which is sent to the servomotor to decrease the reponse error; and means for updating the value of the already determined compensation torque in the case where the response error is more than the threshold value, into a value that enables the response error to be decreased.

BRIEF DESCRIPTION OF THE DRAWINGS

FIG. 5 is a view showing an example of detection of torque signal at the moment of reversal of servo motor.

DESCRIPTION OF THE PREFERRED EMBODIMENTS

Preferred embodiments of a servo adjustment method and an apparatus therefor according to the present invention will now be described with reference to the attached drawings.

Figure 1:
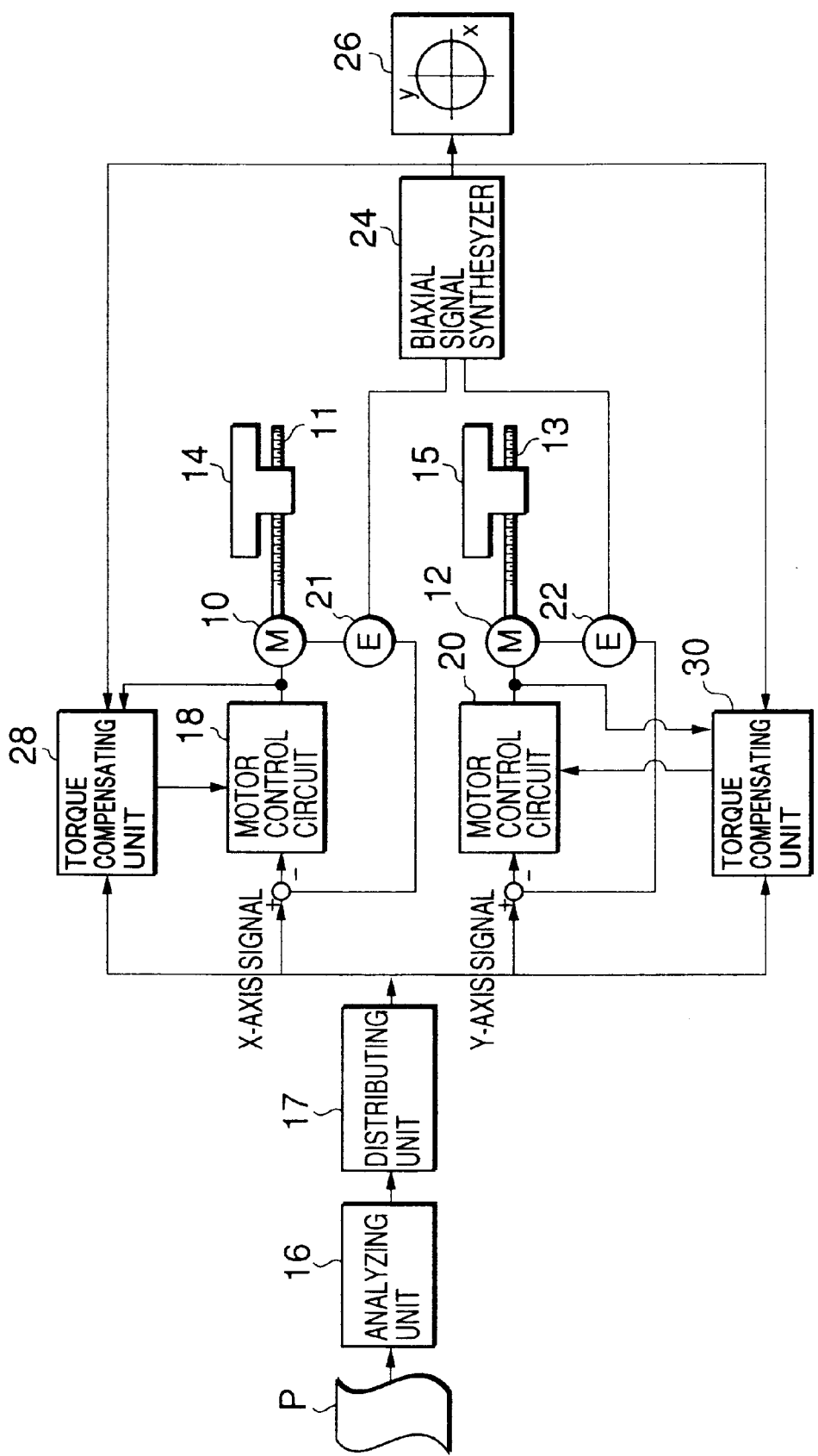
FIG. 1 is a block diagram of a servo control apparatus of semi-closed loop system for carrying out a servo adjustment method according to this invention.

FIG. 1 is a block diagram showing the configuration of a servo control unit for controlling servomotor which feeds table of NC machine tool, for carrying out the servo adjustment method according to this invention. The control unit adopts the semi-closed loop system.

In FIG. 1, reference numeral 10 denotes a servomotor for driving a feed shaft 11 assigned to the X-axis, and reference numeral 12 denotes servo motor for driving a feed shaft 13 assigned to the Y-axis. The servomotors 10, 12 for the Y-axis and the Y-axis for respectively feeding a table 14 and a saddle 15 are controlled in a two-axis control mode simultaneously, to drive the table 14 for a circular interpolation feed motion.

An analyzing unit 16 converts NC program P into command data. Then a distributing unit 17 gives a position instruction signal coresponding to a apecified radius P of a circular arc and a feed speed F to a motor control circuit 18 for controlling the X-axis servomotor 10 and a motor control circuit 20 for controlling the Y-axis servomotor 12 respectively.

The servomotors 10, 12, are proveded with position transducers 21, 22 each comprised of a encoder. Position feedback signals provided by these position transducers 21, 22, are respectively compared with X-axis position instruction signal and Y-axis position instruction signal. Further, the motor control circuits 18, 20 control the servomotors 10,12 so as to follow the instructed position.

Outputs from the position transducers 21, 22 are synthesized by a biaxial signal synthesizer 24, and its output is delivered to a display unit 26 comprised of CRT, etc.

Accordingly, an actual path of the circular interpolation feed motion of the table 14 driven by the servo motors 10, 12 are displayed on a screen of the display unit 26.

Moreover, output of the biaxial signal synthesizer 24 is introduced into torque compensating units 28, 30. The torque compensating units 28, 30 are adapted for calculating a deviation due to the response delay from the instructed position, when its deviation is larger than a threshold value, and for compensating a torque signal for delivering to the servomotors 10, 12 of the X-axis and the Y-axis.

Figure 2:
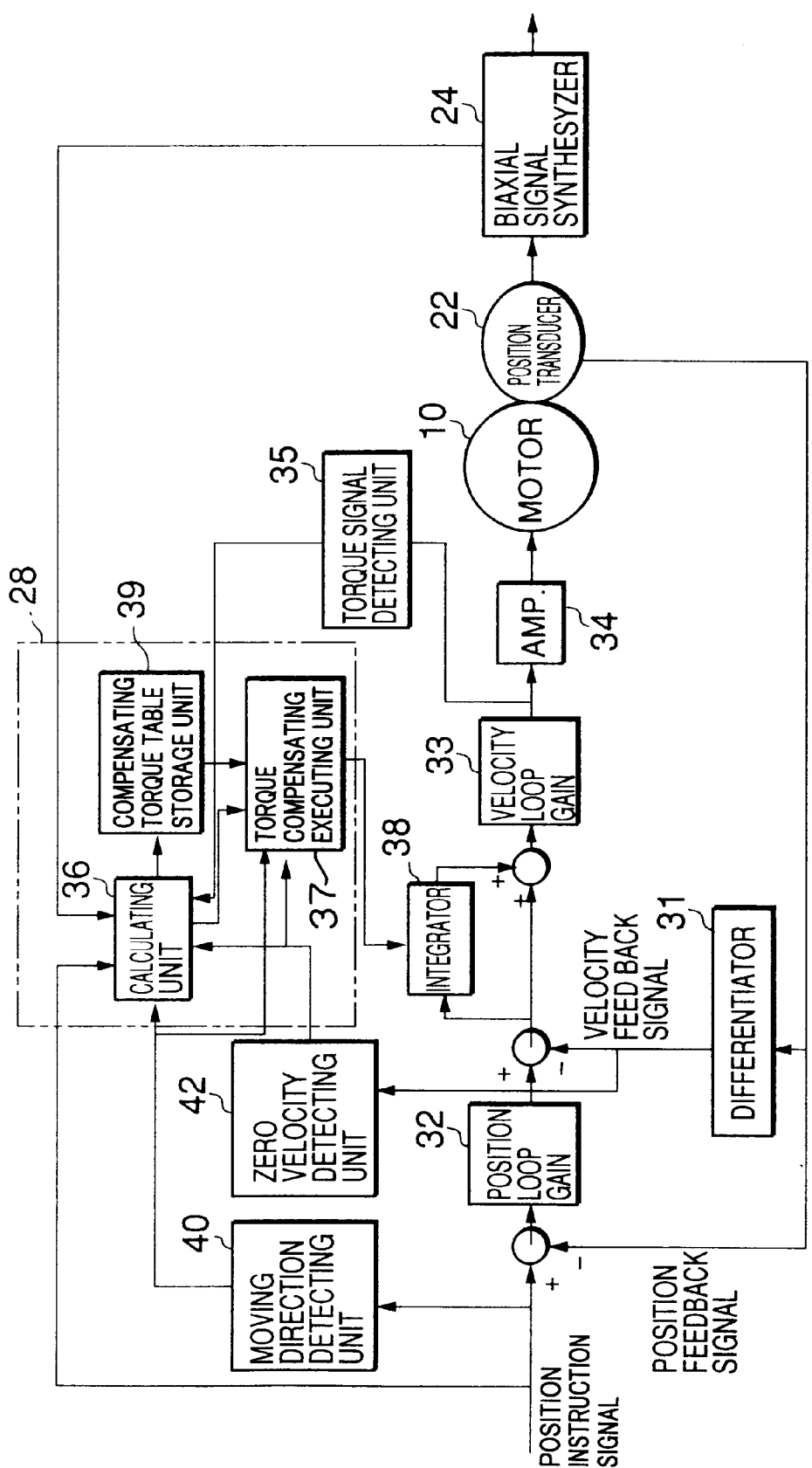
FIG. 2 is a block diagram of a servomotor control circuit in FIG. 1.

FIG. 2 is a block diagram showing the motor control circuit 18 of the X-axis of FIG. 1 in more detailed manner. In this case, the motor control circuit 20 of the Y-axis is similarly constituted (not shown).

A position control loop such that the deviation between a position feedback signal from the position transducer 22 and a position instructed signal reduces to 0 is constituted as the outermost loop. A loop of the inside thereof is a velocity control loop, and the position feedback signal is differentiated by a differentiator 31 so that it is converted into velocity feedback signal. Thereafter, the velocity feedback signal is compared with an output of a position loop gain 32.

A current loop, i.e., a torque loop for controlling torque as a minor loop is on the innerest of the velocity control loop. In this case, an output of a velocity loop gain 33 is amplified by an amplifier 34 as a torque signal and the torque signal is given to servomotor 10. Further, the torque signal is fed back to a torque compensating unit 28 through a torque signal detecting unit 35. This torque compensating unit 28 includes a calculating unit 36 for calculating a threshold value for serving as reference value of updating of a compensation torque for compensating and a response error which is deviation between motor rotational position which has been taken in from the biaxial signal synthesizer 24 and instructed position, and a value of the compensation torque for compensation based on the detected torque signal. In addition, the compensation torque calculated at the calculating unit 36 is introduced into an integrator 38 through a torque compensation executing unit 37 to feed the output of the integrator 38 back to the front of the velocity loop gain 33 so that the compensation of torque is executed.

In this case, resonable values of the compensation torque obtained by repeating compensation for the torque signal are stored into a compensation torque table storage unit 39 as corresponding data so as to provide one-to-one correspondence with a circular arc of radius R and a feed rate F.

Figure 4:
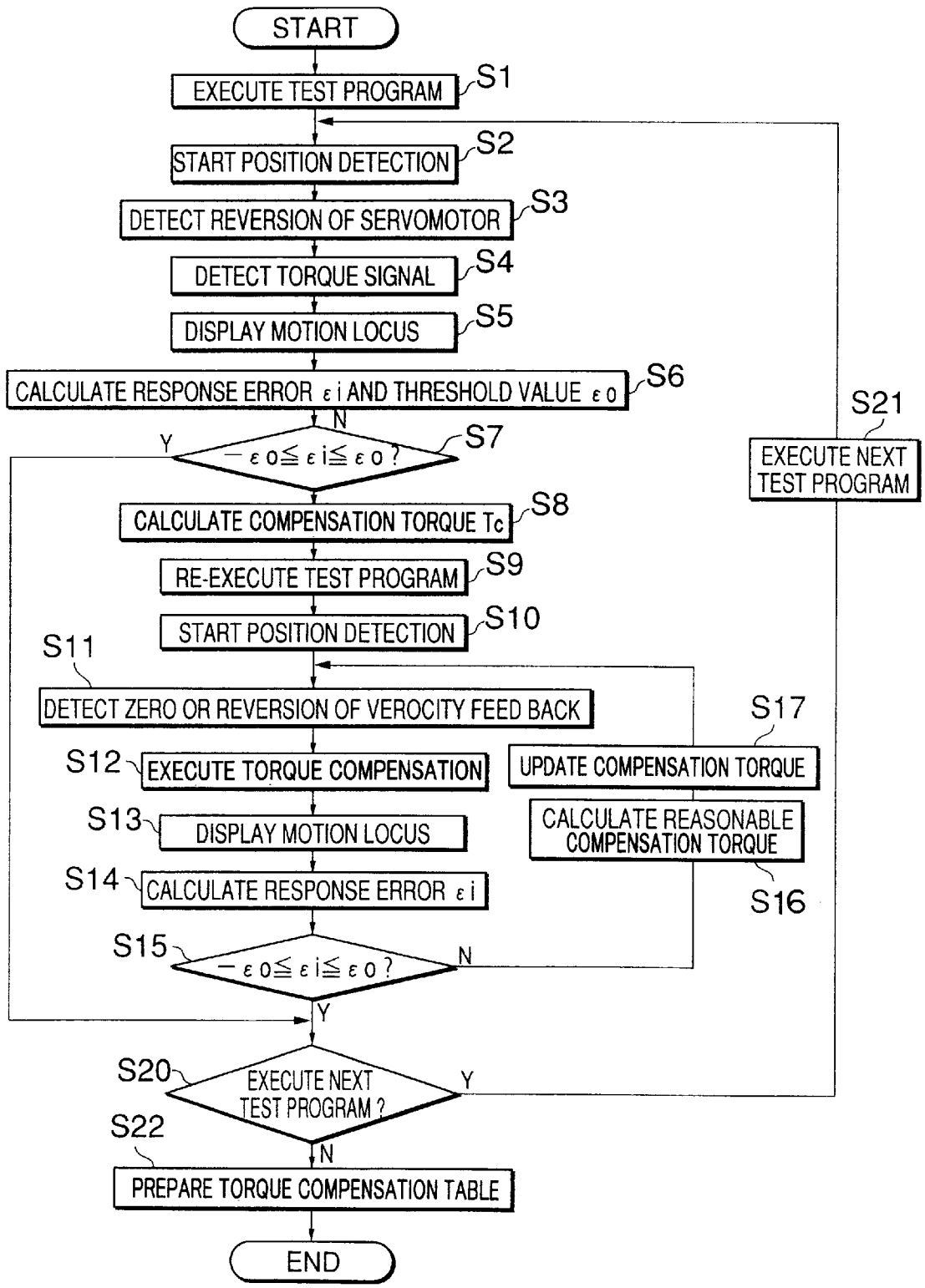
FIG. 4 is a flowchart showing procedure of a servo adjustment method according to this invention.

A servo adjustment method of this invention will now be described in detail with reference to the flowchart of FIG. 4.

Initially, a test program for allowing table 14 to move a circular interpolation feed motion under the condition of a circular arc of a predetermined radius R and a feed rate F is executed (step S1). During execution of this test program, positions of the servomotors 10, 12 are detected by position transducers 21, 22(step S2).

A reversal of the servomotors 10, 12 at the moment of quadrant change is detected by detecting an inversion of the moving direction by a moving direction detecting unit 40 which determines the moving direction from the position instruction signal(step S3). Then, a torque signal when these servomotors 10, 12 are reversed are detected by a torque signal detecting unit 35 with respect to the X-axis and the Y-axis( step S4).

FIG. 5(a) shows the variation of the detected torque signal with time scale. A zero velocity detecting unit 42 recieves a velocity feedback signal to detect timing when the velocity feedback signal becomes equal to zero. The calculating unit 36 reads a torque signal TjA at the moment when the velocity rate is zero.

Subsequently, the torque signal is filtered to remove noise as shown in FIG. 5(b), and the filtered signal is differentiated as shown in FIG. 5(c). Thus, the calculating unit 36 reads torque signal TjB at point B where the value of the differentiated torque signal is zero.

Figure 3:
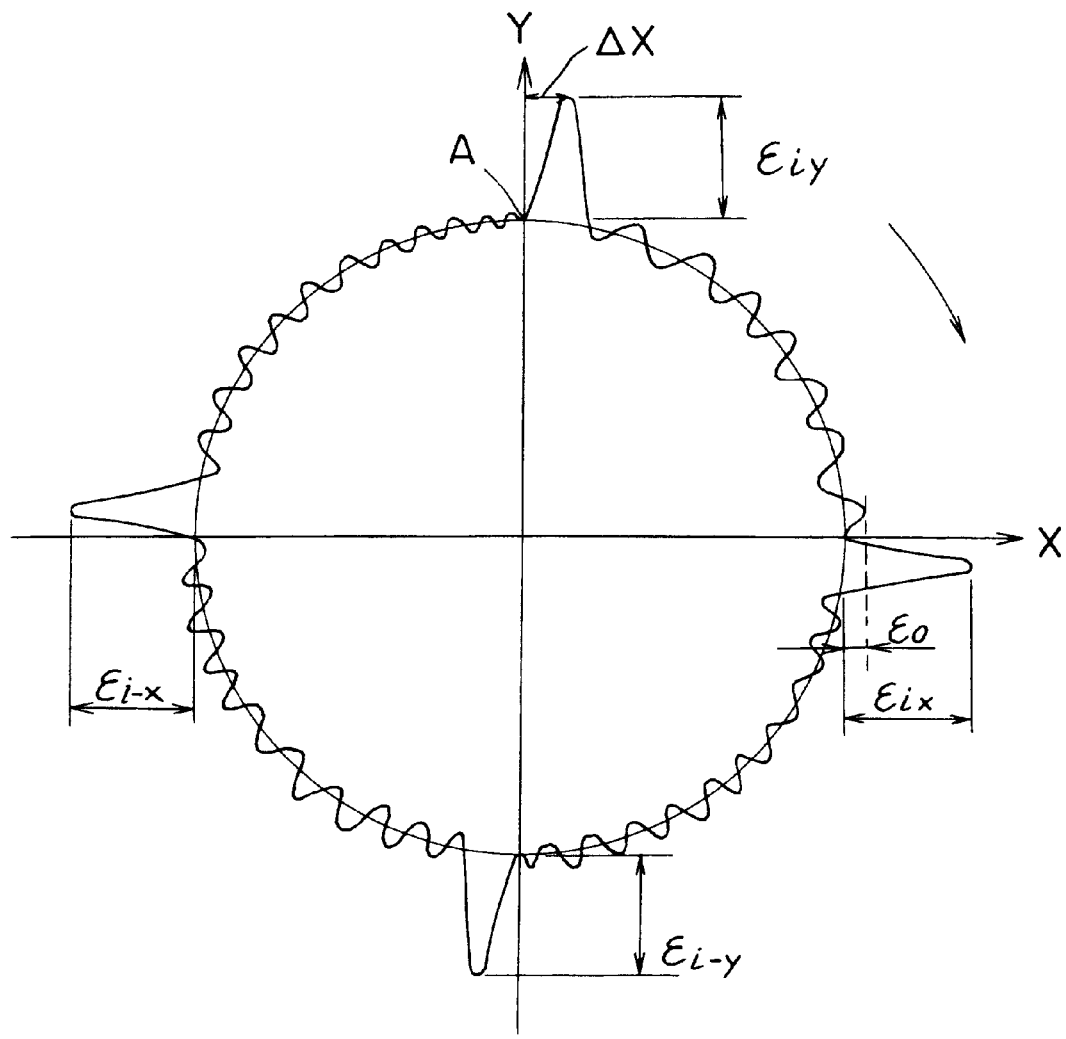
FIG. 3 is a view representing an example of locus of circular arc interpolation feed motion.

Subsequently, outputs of position transducers 21, 22 for detecting positions of the servo motors 10, 12 are synthesizer by the biaxial signal synthesizer 24. Output of this biaxial signal synthesizer 24 is displayed on a display unit 26 (step S5). FIG. 3 is a view showing an example of a displayed locus.

The calculating unit 36 calculates a response error $\epsilon i$ and threshold value $\epsilon 0$ at the moment of the reversal of the servomotor from the position feed back signal given by the position transducers 21, 22 and the position instruction signal (step S6).

Response error $\epsilon i$ means quadrant protrusion at the time of the quadrant change. In order to make distinction from other error, the maximum error within a predetermined time from the moment of the quadrant change (speed feedback signal is 0 or speed feedback signal is inversed) is determined as response error $\epsilon i$. For example, time t required for moving by X in the X-axis direction from point A at the moment of the quadrant change until top vertex of quadrant protrusion $\epsilon iy$ is approximately determined as X/(F/60). In this case, F is feed rate (mm/min). Then, this time t is empirically measured in advance. If the maximum error within the range of 2t from the moment of the detected quadrant change is determined as response error $\epsilon i$ quadrant protrusion can be securely calculated as response error $\epsilon i$.

On the other hand, with respect to threshold value $\epsilon 0$, average value of absolute values of differences excluded quadrant protrusions at every quadrant change is taken as threshold value $\epsilon 0$.

In this way, after the response error $\epsilon i$ and threshold value $\epsilon 0$ are determined, whether or not the response error $\epsilon i$ is smaller than the threshold value $\epsilon 0$ is discriminated (step S7). In this step, in order to exclude the case where the response error $\epsilon i$ deviates toward minus side, i.e., the case of minus, the response error $\epsilon i$ is discriminated as $$-\epsilon 0 \leq \epsilon i \leq 0.$$

If the response error $\epsilon i$ is smaller than the threshold value $\epsilon 0$, the processing operation proceeds to step S20, step S21 to change circular arc radius R and feed rate F into another set of values to execute the next test program.

On the contrary, if response error $\epsilon i$ is greater than the threshold value $\epsilon 0$, the processing operation proceeds to the step S8 and steps subsequent thereto.

At the step S8, compensation torque Tc serving as reference of compensation of the instructed torque for reducing response error $\epsilon i$ is initially calculated. In this step, a variation between torque signal values TjA and TjB expressed below $$\Delta T = TjA - TjB$$

is calculated and, by dividing the value $\Delta T$ by 2, the compensation torque Tc for serving as reference of torque compensation under the condition of the circular arc radius R and the feed rate is obtained.

After the compensation torque Tc is determined in this way, the test program at the same parameter of the circular arc radius R and the feed rate F with the previous trial is re-executed for a second trial (step S9).

Thus, the circular interpolation feed motion under the condition of the radius R and feed rate F is restarted, and position control is carried out while detecting positions of the servomotors 10, 12 by the position transducers 21, 22 (step S10). Further, if quadrant change, i.e., zero of the velocity feedback or the reversal of the velocity feedback signal is detected through the zero velocity detecting unit 42 (step S11), torque compensating is executed in the following manner.

The torque compensating unit 37 reads out the compensation torque Tc to feed it back to the integrator 38 constituting the torque loop. Thus, the torque signal given to the servo motors 10, 12 is compensated (step S12).

Such torque compensating is executed every time when quadrant is changed. Then, a torque-compensated actual motion locus is displayed on the display unit 24 (step S13). It is possible to confirm from the actual motion locus whether or not the expanse of the quadrant protrusion is decreased by compensating the torque signal properly.

At subsequent step S14, similarly to the step S6 at the previous circular interpolation feed motion, the response error $\epsilon i$ is re-calculated. Then, the response error $\epsilon i$ is compared with the threshold value $\epsilon 0$ (step S15). If the response error $\epsilon i$ is decreased by the effect of torque compensation so that it is smaller than the threshold value $\epsilon 0$, the processing operation proceeds to steps S20, S21 to vary the values of the radius R and the feed rate F to execute the next test program.

On the contrary, in the case where torque compensation is not so effective so that the response error $\epsilon i$ is still larger than the threshold value $\epsilon 0$, the processing operation proceeds to step S16. At this step, there is carried out an operation such that the compensation torque Tc which has served as reference of torque compensating is renewed to be such a more reasonable value to decrease the response error $\epsilon i$. For example, the value of the compensation torque Tc is changed into large value by scale of 10%. In this case, value of a new compensation torque Tc become larger value than original compensation torque Tc by 10%. After the value of the compensation torque Tc is updated into the calculated value (step S17), torque compensating is re-executed similarly to the previous steps on the basis of this updated compensation torque Tc (steps S11, S12). In this steps, as a method of updating of compensation torque, a square approximation method,etc. can be used in addition to the above.

At times subsequent thereto, displaing of motion locus (step S13), calculating of a response error $\epsilon i$ (step S14), and comparing the response error $\epsilon i$ with the threshold value $\epsilon 0$ (step S15) are executed. Thus, torque compensating and updating of value of the compensation torque are repeated until the response error $\epsilon i$ is smaller than the threshold value $\epsilon 0$.

If the response error $\epsilon i$ at every quadrant change becomes finally smaller than the threshold value $\epsilon 0$, the processing operation proceeds to execution of the next test program. At times subsequent thereto, in a manner similar to the above, optimum values of compensation torque Tc with respect to various arc radii R and feed rates F are automatically determined. These data of compensation torque are prepared by a calculating unit 36 as torque compensation table which has the data format corresponding to any circular arc radius R and feed rate F (step S22), and are stored into the compensation torque table storage unit 39.

When the NC machining program is executed after servo adjustment is carried out with respect to compensating torque in this way, data of torque compensation table is read by the torque compensating unit 37, and torque compensation is executed at the value of the compensation torque corresponding to arbitrary circular arc radius R and feed rate F at that time. Accordingly, quadrant protrusion can be securely decreased.

It is to be noted that if there are instances where a response error is caused to be large resulting from the fact that processing condition is changed, it is sufficient to execute test program for a second time to update the already prepared torque compensation table.

While the case where the servo control system is the semi-closed system has been explained, it is a matter of course that this invention can be similarly applied also to the case of full-closed loop system to directly detect position of the table 14 to carry out feedback thereof.

As is apparent from the above-mentioned explanation, in accordance with this invention, since torque compensating is repeatedly carried out while updating the compensation torque until response error falls within a predetermined threshold value, reasonable compensation torque such that response error at the moment of reversal of the servomotor is as small as possible can be automatically determined. Thus, quadrant protrusion can be securely decreased.

What is claimed is:

1. An adjustment method for a servo mechanism of servomotors for driving a first feed shaft and a second feed shaft of a moving body, the method comprising:

controlling the servomotor of one of the feed shafts while detecting a position of the moving body so that the moving body follows an instructed position to allow the moving body to move in a circular interpolation feed motion under a condition of a designated circular arc radius and a feed rate;

detecting a reversal of the servomotor in which a direction of motion of the moving body changes;

detecting a torque signal sent to the servomotor at the reversal;

calculating a response error deviated from an instructed position based on the position of the moving body and the instructed position;

setting a compensation torque to a predetermined value for serving as a first reference value for correcting an instructed torque;

setting a threshold value for serving as a second reference value for updating the compensation torque;

comparing the response error produced in the reversal of the servomotor with the threshold value;

updating a value of the determined compensation torque into a value that enables the response error to be decreased in a case where the response error is greater than the threshold value, and allows the moving body to carry out the circular interpolation feed motion in the case where the response error is greater than the threshold value;

compensating, based on the updated compensation torque, the instructed torque which is sent to the servomotor in detecting the reversal of the servomotor to update the compensation torque when the response error is greater than the threshold value; and repeatedly carrying out compensation of the torque and updating the compensation torque until the response error is within the threshold value.

2. The servo adjustment method as set forth in claim 1, further comprising deriving a quadrant protrusion, which corresponds to the response error, from a maximum error with a predetermined time from a moment of a quadrant change.

3. The servo adjustment method as set forth in claim 2, further comprising calculating the threshold value by averaging absolute response errors, excluding quadrant protrusions.

4. The servo adjustment method as set forth in claim 1, further comprising:

allowing the moving body to carry out circular interpolation feed motion under the condition of an arbitrary circular arc radius and feed rate;

determining the compensation torque such that the response error is less than the threshold value for the arbitrary circular arc radius and feed rate; and storing the compensation torque corresponding to the arbitrary circular arc radius and feed rate in a compensation torque table.

5. An adjustment apparatus for a servo mechanism of servomotors for driving a first feed shaft and a second feed shaft of a moving body, the apparatus comprising:

first position detecting means for detecting a position of the moving body driven by a servomotor of the first feed shaft;

second position detecting means for detecting a position of the moving body driven by a servomotor of the second feed shaft;

a servo mechanism for controlling the servomotors of the feed shafts while detecting the position of the moving body such that the moving body follows an instructed position to allow the moving body to move in a circular interpolation feed motion under the condition of a designated circular arc radius and feed rate;

means for detecting a reversal of the respective servo motors;

means for calculating a response error deviated from an instructed position based on the detected position of the moving body and the instructed position;

means for comparing the response error produced at the reversal of the servomotor with a predetermined threshold value;

means for compensating, based on a predetermined compensation torque, the instructed torque which is sent to the servomotor to decrease the response error; and means for updating the value of the already determined compensation torque in a case where the response error is greater than the threshold value, into a value that enables the response error to be decreased.

6. The servo adjustment apparatus as set forth in claim 5, the apparatus further comprising:

a biaxial signal synthesizer for synthesizing output signals of the first position detecting means and the second position detecting means, and means for displaying a motion locus of the moving body based on an output of the biaxial signal synthesizer.

7. The servo adjustment apparatus as set forth in claim 5, wherein the means for compensating the instructed torque determines the compensation torque such that the response error is less than the threshold value and prepares a compensation torque table for storing the compensation torque corresponding to an arbitrary circular arc radius and feed rate.

* * * * *